United States Patent
Kurita et al.

(10) Patent No.: US 8,125,728 B2
(45) Date of Patent: Feb. 28, 2012

(54) DISK DRIVE, HEAD-SLIDER AND METHOD FOR CONTROLLING CLEARANCE OF A READ ELEMENT AND A WRITE ELEMENT IN THE DISK DRIVE

(75) Inventors: Masayuki Kurita, Kanagawa (JP);
Toshiya Shiramatsu, Kanagawa (JP);
Hidekazu Kohira, Kanagawa (JP);
Kenji Kuroki, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/626,445

(22) Filed: Nov. 25, 2009

(65) Prior Publication Data

US 2011/0069408 A1    Mar. 24, 2011

(30) Foreign Application Priority Data

Nov. 29, 2008    (JP) .................. 2008-305774

(51) Int. Cl.
*G11B 21/02*    (2006.01)
(52) U.S. Cl. ....................................... 360/75
(58) Field of Classification Search .............. None
See application file for complete search history.

(56) References Cited

U.S. PATENT DOCUMENTS

| | | | | |
|---|---|---|---|---|
| 7,542,243 B2 * | 6/2009 | Lou et al. | ............ | 360/294.7 |
| 7,701,676 B2 * | 4/2010 | Kubotera et al. | ......... | 360/294.7 |
| 7,724,473 B1 * | 5/2010 | Krajnovich | ............... | 360/235.4 |
| 7,729,088 B2 * | 6/2010 | Kurita et al. | ............... | 360/234.4 |
| 7,859,794 B2 * | 12/2010 | Tani et al. | ................ | 360/235.7 |
| 2004/0190203 A1 | 9/2004 | Albrecht et al. | | |
| 2007/0109687 A1 | 5/2007 | Morikawa | | |
| 2010/0097721 A1 * | 4/2010 | Baumgart et al. | ........ | 360/235.4 |

FOREIGN PATENT DOCUMENTS

JP    2005044416    2/2005

* cited by examiner

*Primary Examiner* — K. Wong

(57) ABSTRACT

A disk drive. The disk drive includes a disk, a head-slider, a moving mechanism, and a controller. The head-slider includes a read/write element, a first heater element, a contact pad, and a second heater element. The read/write element includes a read element configured to read user data from the disk, and a write element configured to write user data to the disk. The moving mechanism is configured to support and to move the head-slider. The controller is configured to control the second heater element to control contact between the contact pad and the disk, and is configured to control clearance between the read/write element and the disk by using the first heater element with the contact pad in contact with the disk.

19 Claims, 7 Drawing Sheets

(a)

(b)

US 8,125,728 B2

DISK DRIVE, HEAD-SLIDER AND METHOD FOR CONTROLLING CLEARANCE OF A READ ELEMENT AND A WRITE ELEMENT IN THE DISK DRIVE

CROSS-REFERENCE TO RELATED APPLICATION

This application claims priority from the Japanese Patent Application No. 2008-305774, filed Nov. 29, 2008, the disclosure of which is incorporated herein in its entirety by reference.

TECHNICAL FIELD

Embodiments of the present invention relate to a disk drive, a head-slider, and a method for controlling clearance of a read element and a write element of the head-slider in the disk drive.

BACKGROUND

Disk drives using various kinds of disks, such as optical disks, magneto-optical disks, flexible magnetic-recording disks, and similar data-storage disks are known in the art. In particular, hard disk drives (HDDs) have been widely used as indispensable data-storage devices for contemporary computer systems. Moreover, HDDs have found widespread application to moving image recording and reproducing apparatuses, car navigation systems, cellular phones, and similar devices, in addition to the computers, due to the outstanding data-storage characteristics of HDDs.

A magnetic-recording disk used in a HDD includes multiple concentric data tracks and servo tracks. A servo track includes multiple servo data regions containing address information. A data track includes multiple data sectors containing user data. A data sector is recorded between separate servo data regions in the circumferential direction of the magnetic-recording disk. A read element and a write element of a head-slider supported by a rotary actuator accesses designated data sectors according to address information in servo data to write data to, and read data from, data sectors.

In order to increase the recording density of a magnetic-recording disk, the clearance between a read/write element of the head-slider flying in proximity to a recording surface of the magnetic-recording disk, and the magnetic-recording disk, as well as variations in the clearance, has continually been decreased, as HDD technology has advanced in concert with the demands of the marketplace for greater recording density. As used herein, the combination of a read element and a write element may be referred to by the term of art, "read/write element." To this end, some mechanisms have been proposed to control the clearance. One such mechanism includes a heater in a head-slider; the heater heats the read element and the write element of the read/write element and the surroundings to adjust the clearance, which is referred to herein by the term of art, "thermal fly-height control," or "TFC." TFC generates heat by applying electrical current to the heater to cause the read element and the write element of the read/write element to protrude by thermal expansion. This reduces the clearance between the magnetic-recording disk and the read/write element, including the read element and the write element. Engineers and scientists engaged in HDD manufacturing and development are interested in the design of HDDs that control the clearance and variations in the clearance between the read/write element of the head-slider and the magnetic-recording disk to meet the rising demands of the marketplace for increased data-storage capacity, performance, and reliability.

SUMMARY

Embodiments of the present invention include a disk drive. The disk drive includes a disk, a head-slider, a moving mechanism, and a controller. The head-slider includes a read/write element, a first heater element, a contact pad, and a second heater element. The read/write element includes a read element configured to read user data from the disk, and a write element configured to write user data to the disk. The moving mechanism is configured to support and to move the head-slider. The controller is configured to control the second heater element to control contact between the contact pad and the disk, and is configured to control clearance between the read/write element and the disk by using the first heater element with the contact pad in contact with the disk.

DESCRIPTION OF THE DRAWINGS

The accompanying drawings, which are incorporated in and form a part of this specification, illustrate embodiments of the invention and, together with the description, serve to explain the embodiments of the present invention:

FIG. 1(a) illustrates the head-slider in the normal state; and, FIG. 1(b) illustrates the head-slider in reading and writing operations, in accordance with an embodiment of the present invention.

Figure 1:
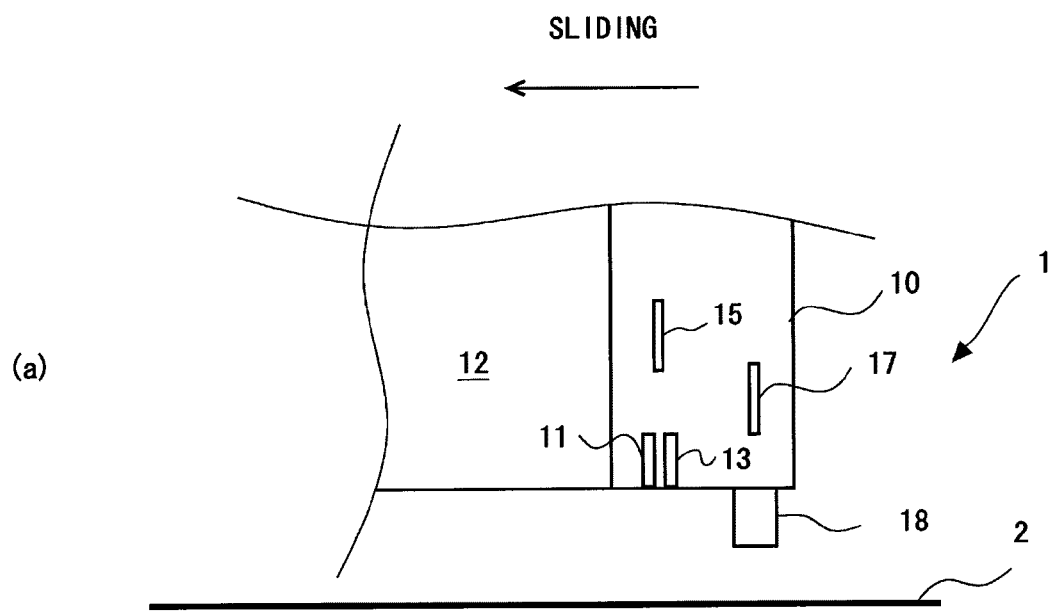
FIGS. 1(a) and 1(b) are cross-sectional views that illustrate a head-slider by way of example.
Figure 1:
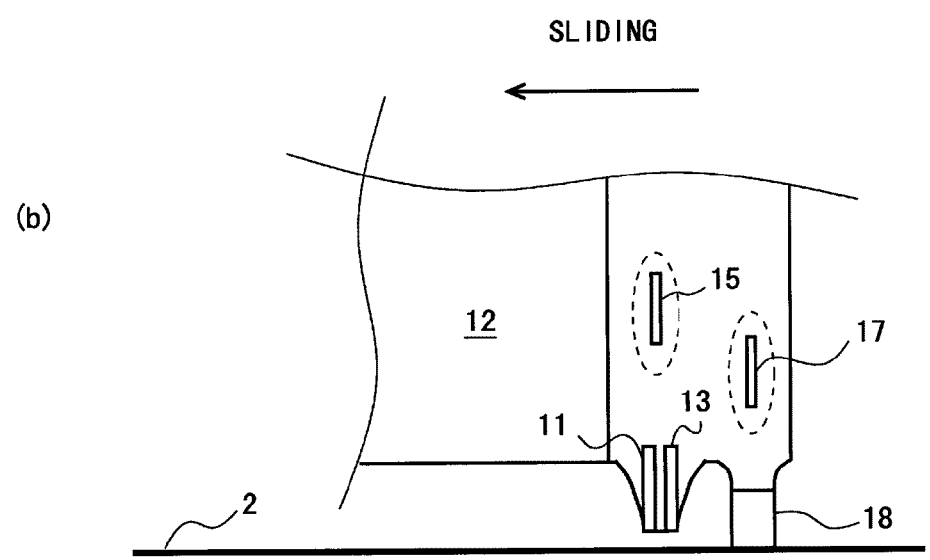

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive, a Head-Slider, and a Method for Controlling Clearance of a Read Element and a Write Element in the Disk Drive With relevance to embodiments of the present invention, the clearance varies with variations in barometric pressure, associated with altitude above sea-level, as well as variations in temperature. The clearance is adjusted based on temperature and barometric pressure for more precise clearance control. The clearance between a read element and a write element of the read/write element and a magnetic-recording disk decreases with barometric pressure. Therefore, a HDD controls a clearance adjustment mechanism in such a manner that the clearance would increase if barometric pressure does not change; and, thus, the HDD through control of the clearance adjustment mechanism maintains the clearance substantially constant.

TFC, which is a clearance adjustment mechanism, is capable of reducing the clearance between a read/write element and a magnetic-recording disk even when the slider fly-height is high, which increases signal-to-noise ratio (SNR), as well as other characteristics, for reading and writing. However, the clearance is reduced with an increase in the recording density of a magnetic-recording disk. As increases in recording density continue to be pursued, the clearance between a read/write element and a magnetic-recording disk is expected to be less than 1 nanometer (nm) in the near future.

However, maintenance of a clearance of a fraction of a nanometer between a read/write element and a magnetic-recording disk is difficult. As described above, TFC adjusts heater power in accordance with environmental conditions such as temperature and barometric pressure; but, eliminating variation in the control is impossible. In addition, maintenance of constant slider fly-height is difficult; and, slight up and down vibrations adversely affect clearance, which may be on the order of a fraction of a nanometer.

With further relevance to embodiments of the present invention, contact recording head-sliders are known in the art as a technique to maintain the clearance between a read/write element and a magnetic-recording disk. A head-slider includes a contact pad to contact a magnetic-recording disk. The technique reads data, or writes, data with the contact pad in contact with the magnetic-recording disk to read data, or write data, while maintaining a small clearance.

However, there are some issues in the contact recording. One issue is the vibration of a head-slider in an up-down direction and a left-right direction, which is nominally in a radial direction of the magnetic-recording disk. If the contact between a contact pad and a magnetic-recording disk is not in a designated state, the head-slider vibrates in the up-down direction, or alternatively, in the radial direction of the magnetic-recording disk. Thus, the contact force of a contact pad with the magnetic-recording disk is to be maintained within a specific range.

Another issue is damage to a read/write element. There is a possibility that frictional stress damages the read/write element upon contact between the read/write element, or the surround of the read/write element, and a magnetic-recording disk when reducing the clearance. Therefore, a contact pad is disposed at a position separated from a read/write element; and, constant clearance is maintained by maintaining the contact pad in contact with the magnetic-recording disk. However, a head-slider wears away a contact pad that is used to maintain contact with the magnetic-recording disk over time. If the clearance of a read/write element is defined by the height of a contact pad, abrasion of the contact pad may change the clearance.

Therefore, embodiments of the present invention are capable of controlling the contact between a contact pad of a head-slider and a magnetic-recording disk and precisely controlling the small clearance of a read/write element in a HDD for reading and/or writing data with the head-slider in contact with the magnetic-recording disk.

In accordance with embodiments of the present invention, a disk drive includes: a disk; a head-slider that includes a read/write element, including a read element configured to read user data from the disk and a write element configured to write user data to the disk, a first heater element, a contact pad, and a second heater element; a moving mechanism configured to support and to move the head-slider; and a controller configured to control the second heater element to control contact between the contact pad and the disk, and configured to control clearance between the read/write element and the disk by using the first heater element with the contact pad in contact with the disk. Thus, in accordance with embodiments of the present invention, the second heater element configured to control the contact pad and the first heater element configured to control the read/write element allow the maintenance of a small clearance between the disk and the read/write element.

In an embodiment of the present invention, the controller is also configured to maintain the contact pad separated from the disk when user data is not being processed with the read/write element. Furthermore, in another embodiment of the present invention, the controller is configured to maintain the contact pad separated from the disk upon reading user data with the read/write element. Thus, embodiments of the present invention reduce the abrasion of the contact pad.

In an embodiment of the present invention, the controller is configured to control the clearance with the first heater element after detecting contact between the contact pad and the disk. Thus, in an embodiment of the present invention, the controller allows more reliable and precise clearance control.

In another embodiment of the present invention, the controller is also configured to control the clearance according to a result of measuring the clearance with the contact pad in contact with disk. Thus, in an embodiment of the present invention, the controller allows more precise clearance control. In another embodiment of the present invention, the controller is configured to determine heater power Pe for the first heater element from preset data and heater power Pcc for the second heater element when the contact pad is in contact with the disk, is configured to access with the read/write element with heater power for the first heater element set at the heater power Pe if the heater power Pe is within a specified range, and resets heater power for the first heater element if the heater power Pe is out of the specified range. Thus, in an embodiment of the present invention, the controller allows precise clearance control by an efficient process.

In another embodiment of the present invention, the controller is configured to measure the clearance with the contact pad in contact with the disk, and is configured to control the clearance according to a difference between a measured clearance and a reference value upon accessing the disk with the write element. Thus, in an embodiment of the present invention, the controller allows efficient clearance control.

In accordance with embodiments of the present invention, a head-slider includes a slider and a thin-film magnetic-recording head on the slider. The thin-film magnetic-recording head includes: a read/write element including a read element configured to read user data from a disk, and a write element configured to write user data to a disk; a contact pad formed on a flying surface of the thin-film magnetic-recording head; a first heater element located closer to the read/write element than the contact pad; and a second heater element located closer to the contact pad than the read/write element. Thus, in accordance with embodiments of the present invention, the second heater element configured to control the contact pad and the first heater element configured to control the read/write element allow the maintenance of a small clearance between the disk and the read/write element.

In one embodiment of the present invention, the thin-film magnetic-recording head includes a single contact pad; the read/write element and the contact pad are arranged in the stacking direction of the thin-film magnetic-recording head such that projections onto the flying surface of the head-slider of the contact pad and of at least a portion of the read/write element overlap when viewed in the stacking direction. Thus, in an embodiment of the present invention, this arrangement allows precise clearance control with simple contact pad control.

In another embodiment of the present invention, the contact pad is formed in proximity to a leading side of the read/write element. As used herein, the following terms of art, "leading-edge side of the head slider," and "trailing-edge side of the head-slider," refer to, respectively, the side of the head-slider facing into the air-stream generated by a rotating magnetic-recording disk, and away from the air-stream generated by a rotating magnetic-recording disk, as for a head-slider disposed in proximity to a rotating magnetic-recording disk in a flying relationship. Moreover, as used herein, the following terms of art, "leading side of the read/write element," and "trailing side of the read/write element," refer to, respectively, a portion of the read/write element disposed closer to the leading-edge side of the head slider than the trailing-edge side of the head-slider, and a portion of the read/write element disposed closer to the trailing-edge side of the head slider than the leading-edge side of the head-slider. In an embodiment of the present invention, the contact pad that is formed in proximity to the leading side of the read/write element allows recording assisted by frictional heat. In another embodiment of the present invention, a groove is formed between the second heater element and the read/write element. Thus, in an embodiment of the present invention, the groove reduces the effect from the second heater element on the clearance of the read/write element. In another embodiment of the present invention, a contact surface of the contact pad with the disk includes carbon. Thus, in an embodiment of the present invention, a contact surface of the contact pad with the disk that includes carbon suppresses the generation of detrimental abrasion debris.

Moreover, embodiments of the present invention include a method for controlling clearance of a read/write element in a disk drive. The method moves a head-slider to a target track. The method controls a second heater element on the head-slider to control contact at the target track between a contact pad and a disk. The method controls clearance between a read/write element and the disk using a first heater element with the contact pad in contact with the disk. Thus, in accordance with embodiments of the present invention, the second heater element configured to control the contact pad and the first heater element configured to control the read/write element allows maintenance of a small clearance between the disk and the read/write element.

Embodiments of the present invention allow precisely maintaining small clearance between a disk and a read/write element. Embodiments of the present invention are subsequently described by way of example of a hard disk drive (HDD), which is an example of a disk drive. In accordance with embodiments of the present invention, a HDD adjusts the clearance between a read/write element and a magnetic-recording disk with a heater element on a head-slider. As described herein, in accordance with embodiments of the present invention, a clearance control which controls the protrusion of the read/write element by heat from the heater element on the head-slider is referred to by the term of art, "thermal fly-height control," or "TFC." In accordance with embodiments of the present invention, the thermal expansion of the read/write element and the surround of the read/write element varies with the heat from the heater element on the head-slider. Thus, in accordance with embodiments of the present invention, the heater element is capable of adjusting the clearance.

In one embodiment of the present invention, the HDD reads and/or writes data with the head-slider in contact with the magnetic-recording disk. In another embodiment of the present invention, the head-slider includes a contact pad to contact the magnetic-recording disk. In another embodiment of the present invention, the head-slider reads and/or writes data with the contact pad in contact with the magnetic-recording disk. In another embodiment of the present invention, the head-slider includes a heater element for the contact pad in addition to the heater element for TFC; and, the contact pad expands by heat from the heater element for the contact pad. In another embodiment of the present invention, the head-slider is separated from the magnetic-recording disk surface; and, the contact pad is not in contact with the magnetic-recording disk in the normal state where the read/write element does not read user data from the magnetic-recording disk, or alternatively, does not write user data to the magnetic-recording disk, respectively.

In one embodiment of the present invention, the HDD supplies power to heat the heater element for the contact pad when reading and/or writing data, and causes the contact pad to protrude such that the contact pad contacts the magnetic-recording disk. In another embodiment of the present invention, the HDD controls the clearance of the read/write element by TFC while maintaining the contact pad in contact with the magnetic-recording disk. Thus, in an embodiment of the present invention, the TFC based on the contact pad in contact with the magnetic-recording disk allows precise and fine clearance control without being affected by variations in control associated with the environment.

In accordance with embodiments of the present invention, the heater element for the contact pad, which causes the contact pad to protrude to contact the magnetic-recording disk, provides contact between the contact pad and the magnetic-recording disk. Furthermore, in accordance with embodiments of the present invention, even if contact with the magnetic-recording disk wears the contact pad, the HDD is capable of controlling the protrusion of the contact pad according to the abrasion to maintain the contact with the magnetic-recording disk.

With reference now to FIGS. 1(a) and 1(b), in accordance with an embodiment of the present invention, drawings are shown that illustrate a head-slider 1. The head-slider 1 depicted in FIG. 1(a) is in the normal state; and, FIG. 1(b) illustrates the head-slider 1 in reading and writing operations. As shown in FIG. 1(a), the head-slider 1 includes a slider 12 that is shown flying in proximity to the recording surface of a magnetic-recording disk 2 and a thin-film magnetic-recording head 10 formed on the slider 12. In the example configuration shown in FIGS. 1(a) and 1(b), the head-slider 1 slides from the right to the left and the thin-film magnetic-recording head 10 is formed in proximity to the trailing edge of the slider 12. The thin-film magnetic-recording head 10 includes a read element 11 and a write element 13. As used herein, the combination of the read element 11 and the write element 13 is referred to by the term of art, "read/write element."

In accordance with embodiments of the present invention, the thin-film magnetic-recording head 10 includes two heater elements 15 and 17. The heater element 15 is a heater element for TFC; and heat from the heater element 15 expands the read element 11, the write element 13 and the surround of the read/write element to control the clearance between the magnetic-recording disk 2 and the read element 11 and the write element 13 of the read/write element. The heater element 17 is a heater element for a contact pad; and, heat from the heater element 17 causes the contact pad 18 to extend toward the magnetic-recording disk 2. The heat from the heater element for contact pad 17 allows adjusting the protrusion amount of the contact pad 18 and brings the contact pad 18 into contact with the magnetic-recording disk 2 in reading data from, and writing data to, the magnetic-recording disk 2.

As depicted in FIGS. 1(a) and 1(b), in accordance with an embodiment of the present invention, the head-slider 12 maintains the contact pad 18 in contact with the magnetic-recording disk 2 in reading user data from, and writing user data to, the magnetic-recording disk 2 (see FIG. 1(b)) and maintains the contact pad 18 separated from the magnetic-recording disk 2 when not reading user data from, and writing user data to, the magnetic-recording disk 2 during in track seeking operation, which is referred to by the term of art, "seek," and track following operation (see FIG. 1(a)). In this way, in accordance with an embodiment of the present invention, maintaining the contact pad 18 separated from the magnetic-recording disk allows reduction of abrasion to the contact pad 18.

As depicted in FIG. 1(b), the head-slider 1 causes the heater element 15 to heat in reading user data from, and writing user data to, the magnetic-recording disk 2 to reduce the clearance of the read/write element. As the contact pad 18 is in contact with the magnetic-recording disk 2 in reading or writing, TFC utilizing the heater element 15 is capable of adjusting the small clearance precisely. In the example of the normal state illustrated in FIG. 1(a), the heater element 15 is not generating heat and the read element 11 and the write element 13 do not protrude. Unlike the example of the normal state, the HDD may control the clearance by TFC for reading servo data when not reading user data from, and writing user data to, the magnetic-recording disk 2. A control circuit included on the HDD controls the head-slider 1 with the two heater elements 15 and 17. Before describing the control of the head-slider 1 in detail, the configuration of the HDD is next described.

Figure 2:
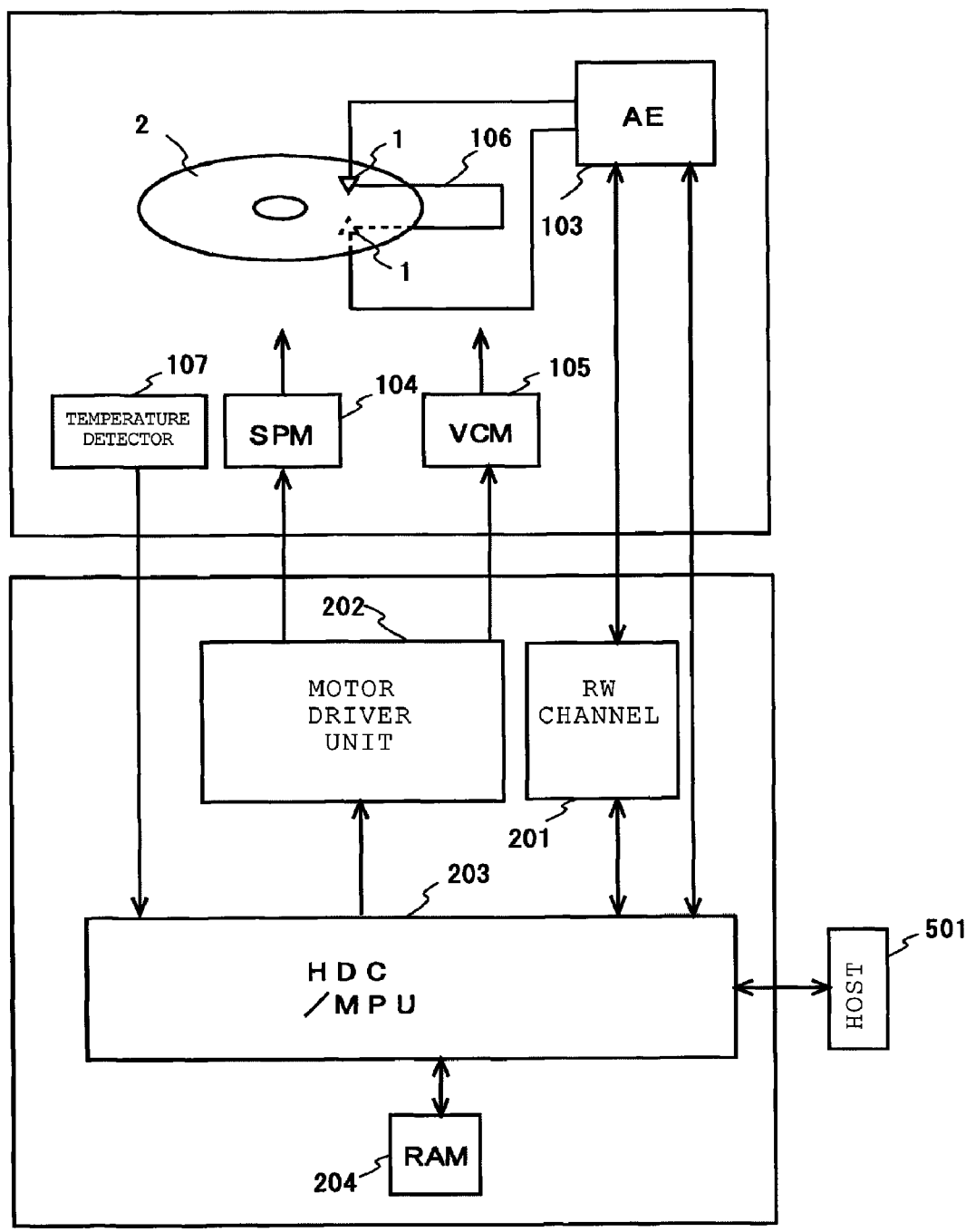
FIG. 2 is an example block diagram schematically illustrating the configuration of a hard-disk drive (HDD), in accordance with an embodiment of the present invention.

With reference now to FIG. 2, in accordance with an embodiment of the present invention, a block diagram is shown that schematically illustrates the configuration of a HDD 100. A HDD 100 includes a magnetic-recording disk 2, which is a disk for storing data, inside a disk enclosure (DE). A spindle motor (SPM) 104 rotates the magnetic-recording disk 2 at a preset angular rate. A head-slider 1 for accessing the magnetic-recording disk 2 is disposed for each recording surface of the magnetic-recording disk 2. The head-sliders 1 are secured at the distal end of an actuator 106. The actuator 106 is connected to a voice coil motor (VCM) 105 and rotates about the pivot shaft to move the head-sliders 1 in proximity to, and in contact with, or alternatively, separated from, the recording surface of the spinning magnetic-recording disk 2 along nominally the radial direction of the magnetic-recording disk 2. A moving mechanism of the head-sliders 1 includes the actuator 106 and the VCM 105.

On a circuit board affixed on the outer surface of the DE, circuit elements are mounted. A motor driver unit 202 drives the SPM 104 and the VCM 105 according to control data from a hard-disk controller/microprocessor unit (HDC/MPU) 203. A random access memory (RAM) 204 functions as a buffer to temporarily store read data and write data. An arm electronics (AE) module 103 in the DE selects a head-slider 1 to access the magnetic-recording disk 2 from the head-sliders 1 and amplifies read-back signals to transmit the read-back signals to a read write channel (RW channel) 201. AE module 103 also transmits the write signals from RW channel 201 to a selected head-slider 1. Furthermore, AE module 103 functions as an adjustment circuit for supplying heaters 15 and 17 on a selected head-slider 1 with power and adjusting the power to the heaters 15 and 17.

RW channel 201, in a read operation, extracts data from read-back signals supplied from AE module 103, and decodes the data. The read data includes user data and servo data. The decoded data are supplied to HDC/MPU 203. RW channel 21, in a write operation, code-modulates write data supplied from HDC/MPU 203, converts the code-modulated data into write signals, and then supplies the write signals to AE module 103.

HDC/MPU 203, which is an example of a controller, performs the control of the HDD 100 in addition to processes concerning data processing, such as: reading and writing operation control; command execution order management; positioning control of the head-sliders 1 using servo signals, which is referred to by the term of art, "servo control;" interface control to and from a host 501; defect management; and error handling when any error occurs. In one embodiment of the present invention, HDC/MPU 203 controls the heaters 15 and 17 on the head-slider 1 to control the clearance in reading and writing operations.

Figure 3:
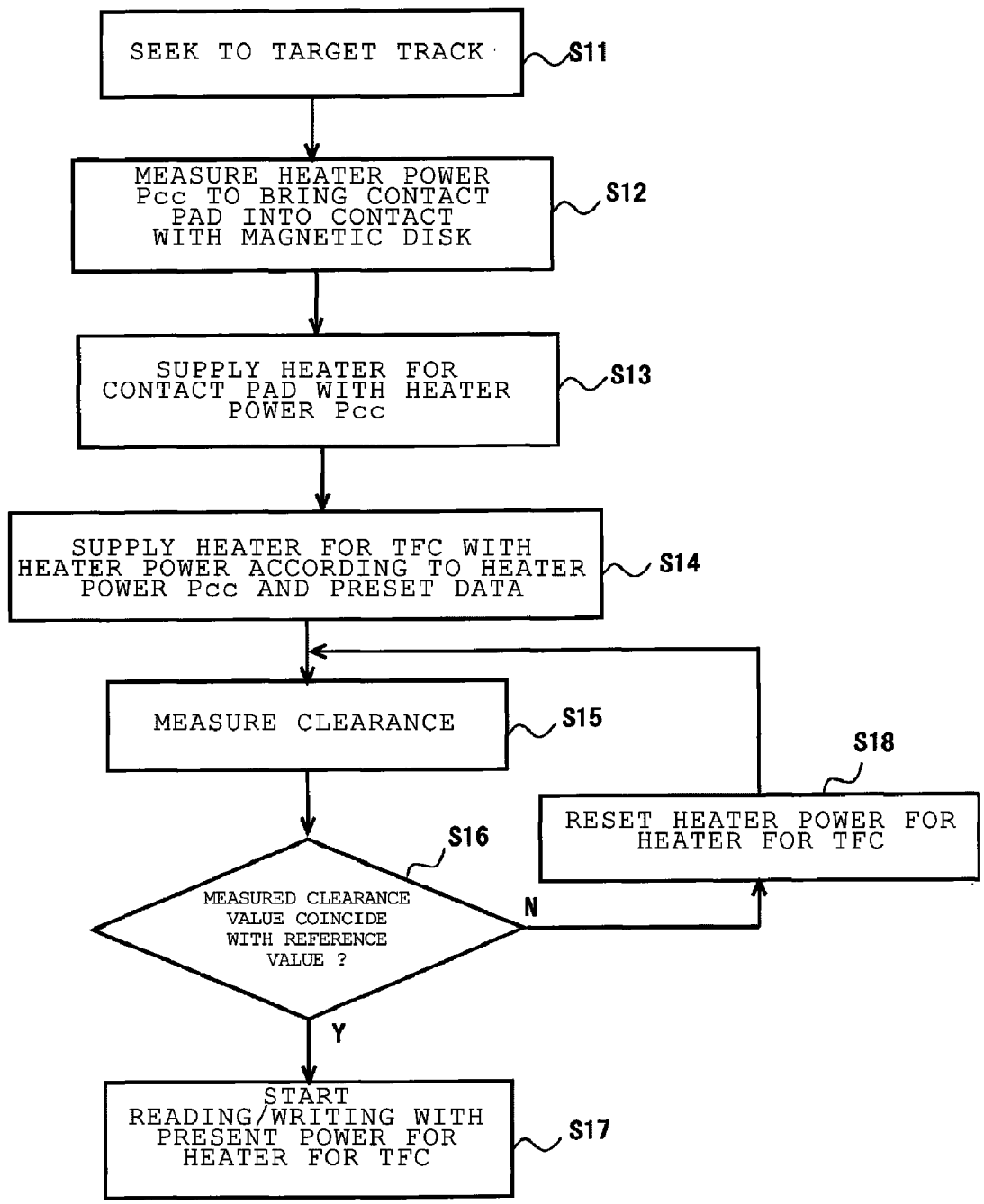
FIG. 3 is an example flowchart showing the flow of a control process of a head-slider in reading user data, and writing user data, by a hard-disk controller/microprocessor unit (HDC/MPU), in accordance with an embodiment of the present invention.

With reference now to FIG. 3, in accordance with an embodiment of the present invention, a flowchart is shown that shows the flow of a control process of a head-slider in reading user data and writing user data by HDC/MPU 203. A control method of the head-slider 1 by HDC/MPU 203 in the reading and the writing of the user data is next described referring to the flowchart shown in FIG. 3. HDC/MPU 203 receives a write command or read command from the host 501 and moves the head-slider 1 to the data track with the address indicated by the command, which is a seek, at S11. In the seek operation, the contact pad 18 is separated from the magnetic-recording disk surface; and, the heater element 17 for the contact pad is in the OFF state.

HDC/MPU 203 provides the motor driver unit 202 with control data according to servo data read by the read element 11 to control the VCM 105 for moving the head-slider 1, which is affixed to actuator 106, to the target position. HDC/MPU 203 may control the heater element 15 for the read/write element to control the clearance of the read element 11 of the read/write element for reading out servo data. HDC/MPU 203 sets control data in a register in the AE module 103 to control heater power supplied to the two heater elements 15 and 17.

If the head-slider 1 has reached the target position, HDC/MPU 203 positions the head-slider 1 to the target position, which is a track following. HDC/MPU 203 measures the heater power for the heater element for contact pad 17 to bring the contact pad 18 into contact with the magnetic-recording disk 2, at S12. The fly-height of the slider 12 varies with barometric pressure; and, the protrusion amount of the contact pad 18 varies with temperature. The contact detection of the contact pad 18 allows bringing the contact pad 18 into contact with the magnetic-recording disk 2 in a proper state regardless of environmental variations.

Specifically, HDC/MPU 203 gradually increases heater power supplied to the heater element for the contact pad 17 to cause the contact pad 18 to protrude incrementally. If the contact pad 18 contacts the magnetic-recording disk 2, HDC/MPU 203 uses the heater power Pcc in reading data from, and writing data to, the magnetic-recording disk 2. In accordance with embodiments of the present invention, there are various ways to detect the contact of the contact pad 18. For example, HDC/MPU 203 may detect the contact with the current of SPM 104. If the contact pad 18 contacts the magnetic-recording disk 2, the SPM current exhibits a change greater than a predetermined value. By way of other examples, HDC/MPU 203 may detect the contact by monitoring variations in the VCM current, or alternatively, the read-back signal amplitude of the read element 11.

Environmental conditions vary from moment to moment. Therefore, in an embodiment of the present invention, HDC/MPU 203 measures the contact heater power for the contact pad 18 at every seek operation. However, if the seek target is close to the current position, or if HDC/MPU 203 has ever performed a seek operation to the same target data track, or a data track in proximity to the same target data under similar conditions that have occurred before, HDC/MPU 203 may supply the heater element for contact pad 17 with the same heater power as for the above-described circumstances.

Next, at S14, HDC/MPU 203 controls the heater element 15 for TFC while providing the heater element 17 for the contact pad 18 with the heater power Pcc, at S13. HDC/MPU 203 calculates heater power Pe for the heater element 15 for TFC from the heater power Pcc and preset data and controls the AE module 13 to supply the heater element 15 for TFC with the calculated heater power Pe.

The clearance of the read/write element, associated with the read-element clearance and/or write-element clearance, is expected to be a designated value at the heater power Pe. At a test operation, the HDD 100 is provided with data, which is the above-described preset data, indicating the relationship between the heater power Pcc for the heater element 17 for the contact pad 18 and the heater power Pe for the heater element 15 for TFC of the read/write element, which includes the read element 11 and the write element 13, allowing a designated element clearance. HDC/MPU 203 calculates the heater power Pe from the heater power Pcc determined by measurement and the preset data. The preset data are a table, or alternatively, a function or functions.

If there is a difference in the protrusion caused by temperature between the contact pad 18 and the read/write element, which includes the read element 11 and the write element 13, the table and the function include a variable of temperature. Specifically, the table is a matrix for determining the heater power Pe from the detected temperature by the temperature detector 107 and the heater power Pcc.

If the preset data is a function, HDC/MPU 203 includes a function depending on the variable of temperature; and if the preset data are functions, HDC/MPU 203 includes functions for temperature ranges, selects a function corresponding to the temperature detected by the temperature detector 107 and calculates the heater power Pe of the heater element for TFC 15 from the selected function and the heater power Pcc. A table, or alternatively, a function, is prepared for each of the read operation and the write operation; and, in an embodiment of the present invention, a table, or alternatively, a function, is prepared for each head-slider. A determination method of data for calculating the heater power Pe of the heater element 15 for TFC is subsequently described.

At S15, HDC/MPU 203 calculates the current clearance of the read/write element from the amplitude of read-back signal of the read element 11 while supplying the heater power Pcc and Pe to the heater elements 17 and 15, respectively. HDC/MPU 203 may calculate the clearance with the gain value of a variable gain amplifier (VGA) in RW channel 201, or alternatively, with the resolution of a read-back signal.

For example, the resolution is represented by the ratio between a specific lower frequency signal component and a specific higher frequency signal component. With an appropriate linear transformation applied to the resolution, the clearance may be expressed by a linear function of the resolution. If the clearance reduces, the amplitudes of the higher frequency signal components increase; and, the resolution becomes higher. The VGA gain also reduces with the clearance.

At S16, HDC/MPU 203 determines whether the measured clearance of the read/write element is a preset reference value. The clearance is, for example, represented by the VGA gain, or alternatively, by the resolution. A method for determining the reference value is subsequently described. If the difference between the measured clearance and the reference value falls within a specified range and the measured clearance and the reference value may be regarded as the same value (Y-branch after S16), then the clearance of the read element 11 is at the designated value. Therefore, at S17, HDC/MPU 203 starts writing or reading data at the heater power Pcc and the heater power Pe.

If the difference between the measured clearance and the reference value is over the specified range (N-branch after S16), then the clearance of the read element 11 is larger, or alternatively, smaller, than the designated value. The main reason why the measured clearance does not coincide with the reference value is the abrasion of the contact pad 18. Then, at S18, HDC/MPU 203 resets the heater power of the heater element 15 for TFC. HDC/MPU 203 increases, or alternatively, decreases, the heater power of the heater element 15 according to whether the measured clearance value is larger, or alternatively, smaller, than the reference value. The amount of change of the heater power may vary depending on the difference between the reference value and the measured clearance value, or alternatively, be a specified fixed value.

Again at S15, HDC/MPU 203 measures the clearance, after resetting the heater power for the heater element 15, at S18. HDC/MPU 203 repeats the heater power resetting and the clearance measurement until the measured clearance value coincides with the reference value. This procedure allows reading and writing data at a designated clearance. If the measured clearance value is reliable, HDC/MPU 203 may start writing or reading data without re-measuring the clearance after resetting the heater power.

In an embodiment of the present invention, if HDC/MPU 203 has reset the heater power of the heater element 15, HDC/MPU 203 updates the preset data for calculating the heater power Pe of the heater element 15, because a difference is expected going forward for future heater power settings of the heater element 15 since the contact pad 18 is constantly being worn down. HDC/MPU 203 updates the preset data so as to compensate for the difference between the power of the heater element 15 determined from an on-going clearance measurement and the power calculated from the preset data before update.

In an embodiment of the present invention, the reference value used in the clearance measurement of the read/write element and the data for calculating the heater power of the heater element 15 are preprogrammed in the HDD 100. These data are determined in a test operation applied to the HDD 100, or alternatively, determined by measurement on start up. Specifically, HDC/MPU 203 measures the heater power to cause contact between the read/write element and the magnetic-recording disk 2 with the contact pad 18 in contact with the magnetic-recording disk 2 to determine the above-described data. In a test operation, the measurement is carried out at different drive temperatures.

HDC/MPU 203 measures the heater power of the heater element 15 to cause the contact of the heater element 15. The contact of the read/write element may be detected in the same manner as the contact of the contact pad 18. HDC/MPU 203 determines the value calculated by subtracting the heater power value corresponding to the designated clearance from the measured value as the heater power Pe of the heater element 15 associated with the drive temperature, which is the detected temperature of the temperature detector 107, under these circumstances and the power Pcc of the heater element 17. The relationship of the heater power Pe to the heater power Pcc and temperature is the above-described preset data. Furthermore, HDC/MPU 203 measures the clearance at the heater power Pe and Pcc, and registers the value as the reference value. In this way, the preset data and the reference value used in the process described referring to the flowchart in FIG. 3 are registered in the HDD 100.

Figure 4:
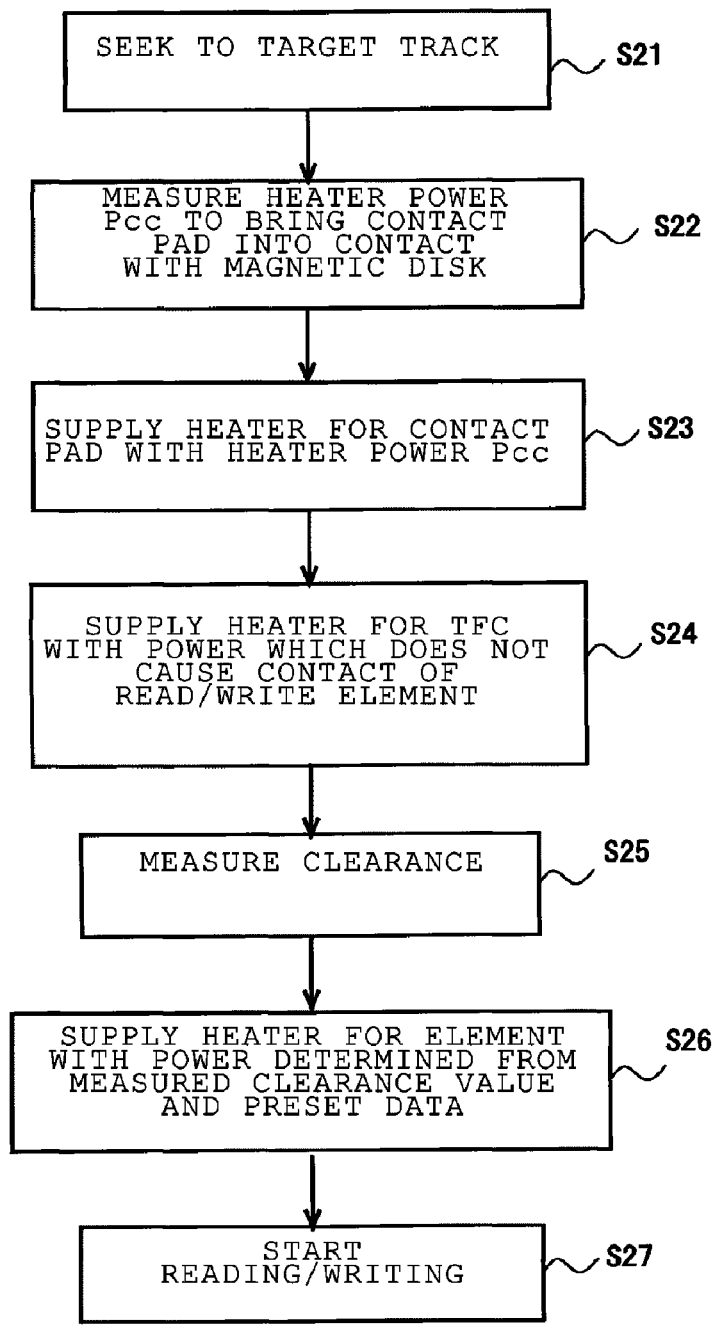
FIG. 4 is another flowchart showing the flow of a control process of a head-slider in reading user data, and writing user data, by a HDC/MPU, in accordance with an embodiment of the present invention.

With reference now to FIG. 4, in accordance with an embodiment of the present invention, another flowchart is shown that shows the flow of a control process of a head-slider in reading user data and writing user data by HDC/MPU 203. Another method for determining the heater power Pcc and Pe for data reading and writing is next described referring to the flowchart shown in FIG. 4. In the flowchart in FIG. 4, operations S21 to S25 are the same as the operations S11 to S15 in FIG. 3 and the description thereof is omitted. After the clearance measurement, at S25, HDC/MPU 203 supplies the heater element 15 with heater power such that the clearance coincides with the designated value, which is the reference value in the process described referring to FIG. 3, at S26. The heater efficiency, given in units of nanometer per milliwatt (nm/mW), is preset; and, HDC/MPU 203 calculates the heater power Pe from the difference between the measured clearance value and the designated value, which is the reference value.

At S27, HDC/MPU 203 starts reading user data from, and/or writing user data to, the magnetic-recording disk 2 at the heater power Pcc of the heater element 17 determined by detecting the contact of the contact pad 18 and the calculated heater power for the heater element 15. If the element clearance may be measured accurately, the process is capable of determining the heater power for the heater element 15 efficiently. In order to increase the accuracy of clearance measurement, in accordance with an embodiment of the present invention, the clearance is measured while the heater element 15 is supplied with power. The process described referring to FIG. 3 measures the clearance when the clearance is smaller, at S15, allowing a more precise heater power setting. In accordance with embodiments of the present invention, the structure of the head-slider 1 for the HDD 100 is next described.

Figure 5:
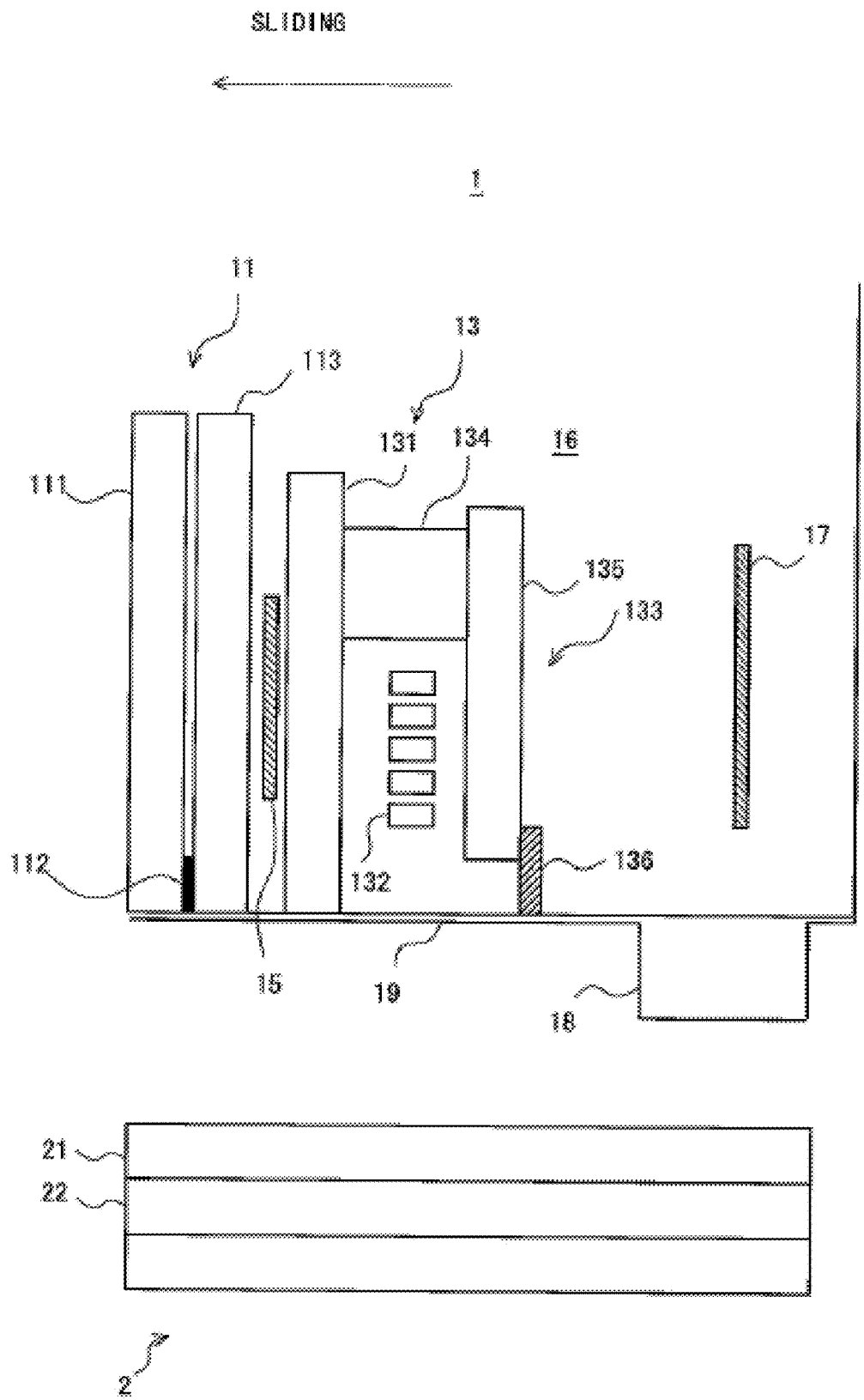
FIG. 5 is a cross-sectional view that illustrates an example head-slider structure, in accordance with an embodiment of the present invention.

With reference now to FIG. 5, in accordance with an embodiment of the present invention, a cross-sectional view is shown that illustrates the head-slider structure. The read element 11 is formed on the slider 12, which is included by a substrate; and, the write element 13 is formed above the read element 11. The rotational direction of the magnetic-recording disk 2 is from the left to the right in FIG. 5. Thus, the head-slider 1 slides from the right to the left in FIG. 5.

In FIG. 5, the fore side of the sliding head-slider 1 is referred to by the term of art, "leading-edge side;" and, the aft side of the head-slider 1 is referred to by the term of art, "trailing-edge side." In the configuration of FIG. 5, the read element 11 is located closer to the leading-edge side than the write element 13; and, the write element 13 is located closer to the trailing-edge side than the read element 11. The read element 11 includes a lower shield 111, a magnetoresistive effect element 112, and an upper shield 113, which are stacked in this order from the leading-edge side of the head-slider 1. The magnetoresistive (MR) sensor element 112 is disposed between the two shields 111 and 113, which include a magnetic metal. The write element 13 includes a return pole 131, a thin-film coil 132, and a main pole 133, which are stacked in this order from the leading-edge side of the head-slider 1. The two poles also include a magnetic metal, which may differ in composition from the magnetic metals used for the shields 111 and 113.

The main pole 133 includes a main pole yoke 135 and a main pole tip 136. The main pole yoke 135 and a main pole tip 136 include a magnetic metal, which may have yet another composition. The main pole yoke 135 is connected to the return pole 131 through a back-gap portion 134. The main pole tip 136 is joined with the tip of the main pole yoke 135 on the magnetic-recording-disk side of the head-slider 1. The main pole tip 136 defines the data track width on the magnetic-recording disk 2.

The magnetic flux, emanating from the main pole 133, flows in a magnetic circuit passing through a magnetic-recording layer 21 of the magnetic-recording disk 2 and a soft magnetic underlayer 22 of the magnetic-recording disk 2, and entering the return pole 131. This magnetic flux records a magnetization pattern in the magnetic-recording layer 21. Between the magnetic-recording layer 21 and the soft magnetic underlayer 22, an intermediate layer may be disposed. On the other hand, the MR sensor element 112 of the read element 11 may include: a giant magnetoresistance (GMR) element, a tunneling magnetoresistance (TMR) element, or similar MR sensor elements. The magnetic field from the magnetic recording layer 21 changes the resistance of the MR sensor element 112. The read element 11 converts changes in the magnetization of the magnetic-recording layer into electrical signals with reference to changes in the resistance of the MR sensor element 112.

In the configuration example in FIG. 5, the heater element 15 is formed in a layer between the write element 13 and the read element 11. The heater element 15 is located closer to the read/write element than the contact pad 18. The heater element 15 may include a wound thin-film resistive element using permalloy. The space around the read element 11, the write element 13, and the heater element 15 is filled with a non-magnetic insulating film 16, which may include, for example, alumina.

When the heater element 15 is supplied with electrical power, the heater element 15 generates heat. The heat expands the read element 11, the write element 13 and the surrounding alumina. The expansion causes protrusion of the read element 11 and the write element 13 toward the magnetic-recording disk 2 to reduce the clearances of the read element 11 and the write element 13 with the magnetic-recording disk 2. The expansion amount depends on the heating value, which is determined by the supplied electrical power, of the heater element 15.

The contact pad 18 is formed in proximity to the trailing side of the read/write element, which is in proximity to the trailing-edge side of the head-slider 1. In an embodiment of the present invention, the contact surface of the contact pad 18 includes carbon. The contact surface of the contact pad 18 may be the same material as an overcoat layer 19 on the flying surface of the head-slider 1 that faces the opposing recording surface of the magnetic-recording disk 2. Since carbon changes to carbon dioxide and does not generate abrasion debris, a detrimental effect from the abrasion of the contact pad 18 may be avoided. The whole contact pad 18 may include carbon; or alternatively, the inner portion may include alumina, and the exposed outer layer to contact the disk may include carbon.

The heater element for contact pad 17 is formed behind the contact pad 18. The heater element 17 is located closer to the contact pad 18 than the read/write element. The material of the heater element 17 may be the same as the material of the heater element 15. In order to reduce the effect of heat from the heater element 17 on the read/write element, which includes the read element 11 and the write element 13, the heater element 17 is located farther from the read/write element, including the read element 11 and the write element 13, compared to the heater element 15. The heat of the heater element 17 expands surrounding alumina 16 and then the contact pad 18 protrudes toward the magnetic-recording disk 2.

In one embodiment of the present invention, in order to reduce the power of the heater element 17 and the effect of heat on the read/write element, the contact pad 18 is closest to the magnetic-recording disk 2 on the flying surface when the heater element 17 is off. In accordance with embodiments of the present invention, the heater element 17 is formed close to the contact pad 18. Typically, the contact pad 18 and the heater element 17 are formed to overlap one another when viewed from the recording surface of the magnetic-recording disk.

Figure 6:
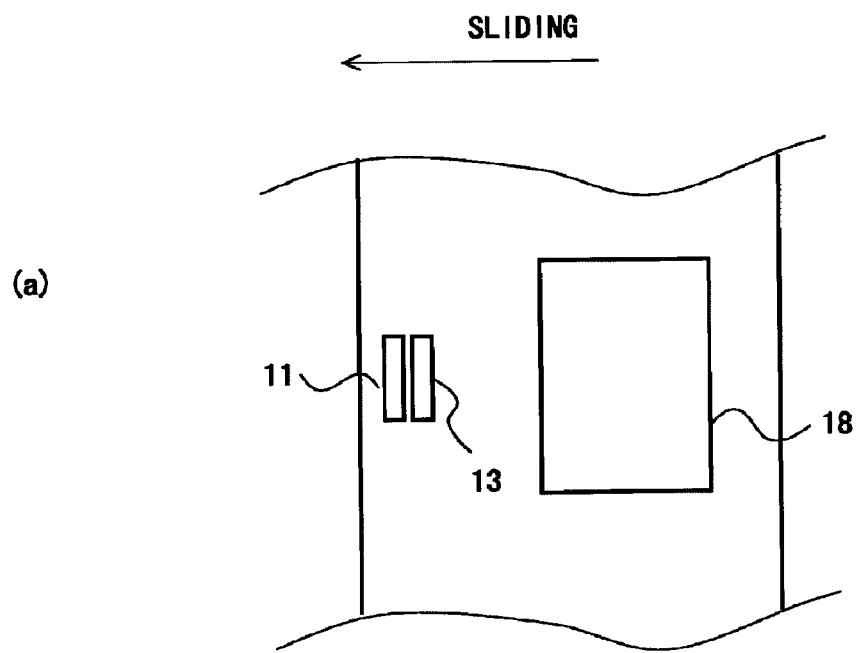
FIGS. 6(a) and 6(b) are plan views that illustrate the positional relationship between a contact pad and a read element and a write element of a read/write element in an example head-slider structure, in accordance with an embodiment of the present invention.
Figure 6:
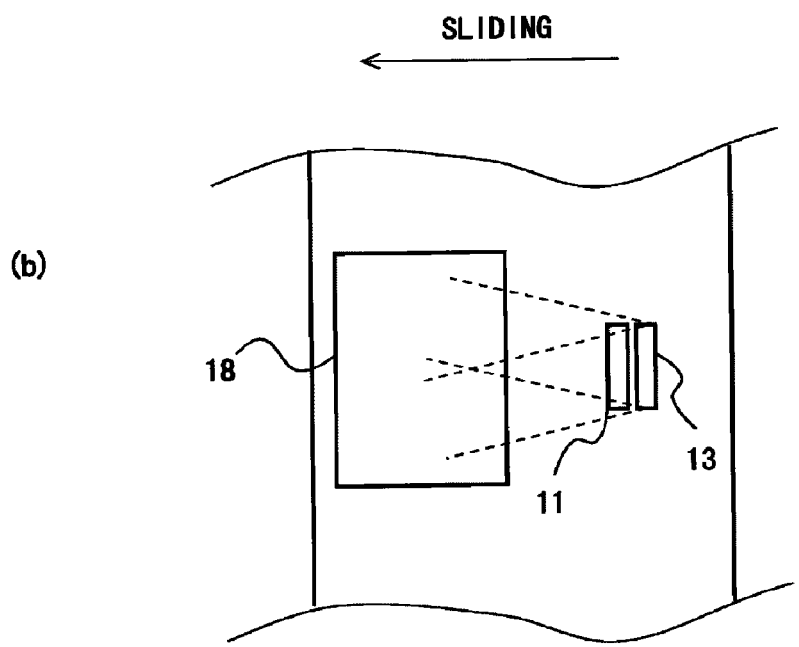

With reference now to FIGS. 6(a) and 6(b), in accordance with an embodiment of the present invention, drawings are shown that illustrate the positional relationship between the read/write element, including the read element 11 and the write element 13, and the contact pad 18 viewed from the magnetic-recording disk 2, in other words, viewed looking down on the flying surface of the head-slider 1. The read/write element, including the read element 11 and the write element 13, and the contact pad 18 are arranged in the longitudinal direction, which is the sliding direction, of the head-slider 1. In FIG. 6(a), the contact pad 18 is located in proximity to the trailing side of the read/write element, including the read element 11 and the write element 13. On the other hand, in FIG. 6(b), the contact pad 18 is located in proximity to the leading side of the read/write element, including the read element 11 and the write element 13.

In an embodiment of the present invention, for the precise clearance control of the read/write element, including the read element 11 and the write element 13, the read/write element and the contact pad 18 are located in proximity to one another. In another embodiment of the present invention, the head-slider 1 may include a single contact pad, in other words, only one contact pad. The head-slider 1 including a single contact pad more easily provides accurate control of element clearance with the single contact pad than a head-slider 1 including a plurality of contact pads.

In an embodiment of the present invention, if using a head-slider with a single contact pad, the contact pad 18 and the read/write element are arranged in the stacking direction of the thin-film magnetic-recording head in such a manner that the projections onto the flying surface of the head-slider 1 of the contact pad 18 and of at least a portion of the read/write element overlap one another when viewed in the stacking direction. Moreover, in an embodiment of the present invention, the center lines of the read/write element and the contact pad are aligned in the radial direction of the magnetic-recording disk 2. As shown in FIGS. 6(a) and 6(b), these alignment conditions are satisfied. The contact pad 18 formed at this position allows more precise element clearance control.

In an embodiment of the present invention, the HDD 100 records data with the assistance of frictional heat generated between the contact pad 18 and the magnetic-recording disk 2. In the HDD 100, as illustrated in FIG. 6(b), the contact pad 18 is located on the leading side of the write element 13; and, the write element 13 follows the path of the contact pad 18. Furthermore, in an embodiment of the present invention, variations in the sliding direction of the write element 13 are taken into consideration, because of skew. Therefore, for both the innermost data track and the outermost data track, the position, shape and size of the contact pad 18 are determined such that the write element 13 passes over the area where the contact pad 18 has passed.

If the rotational direction of the magnetic-recording disk 2 is reverse to the aforementioned examples, the leading-edge side and the trailing-edge side of the head-slider 1 are reversed. Namely, the lower side of the thin-film magnetic-recording head 10 is located closer to the trailing-edge side of the head-slider 1 and the upper side is located closer to the leading-edge side of the head-slider 1. In such a HDD 100, the above description may be applied to the relationship between the contact pad 18 and the read/write element, including the read element 11 and the write element 13.

In accordance with embodiments of the present invention, in order to easily and precisely control the protrusion amount of the contact pad 18 and the read/write element, including the read element 11 and the write element 13, the effect of the heat of the heater element 15 on the protrusion amount of the contact pad 18 and the effect of the heat of the heater element 17 on the protrusion amount of the read/write element, including the read element 11 and the write element 13, are reduced. In another embodiment of the present invention, heat from the heater element 17 is interrupted to the read/write element, including the read element 11 and the write element 13 in order to control the element clearance precisely.

Figure 7:
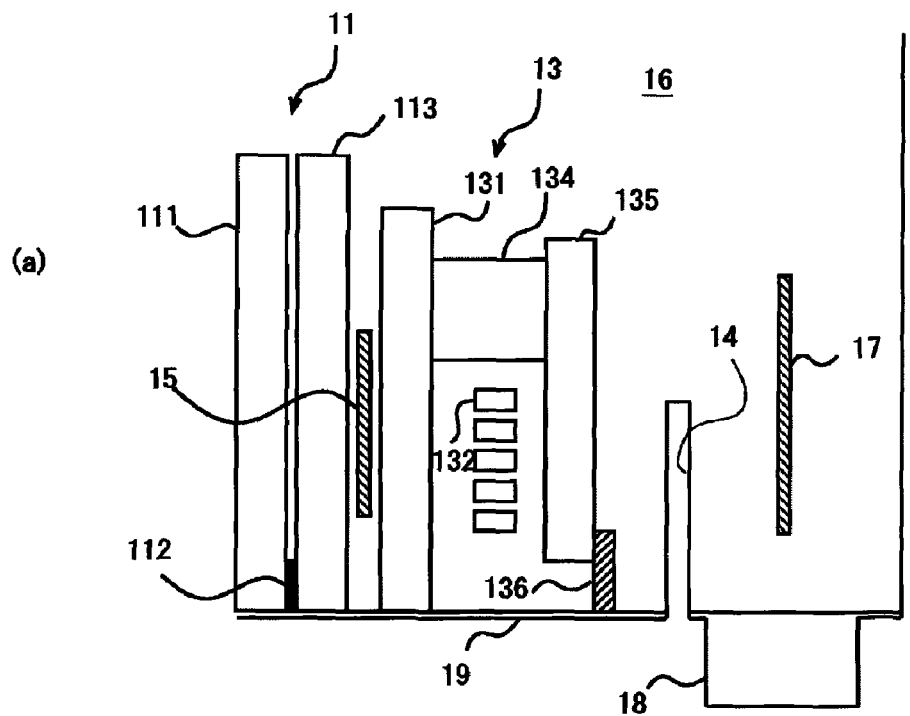
FIGS. 7(a) and 7(b) are drawings, respectively, a cross-sectional view, and a plan view, that illustrate another example head-slider structure, in accordance with an embodiment of the present invention.
Figure 7:
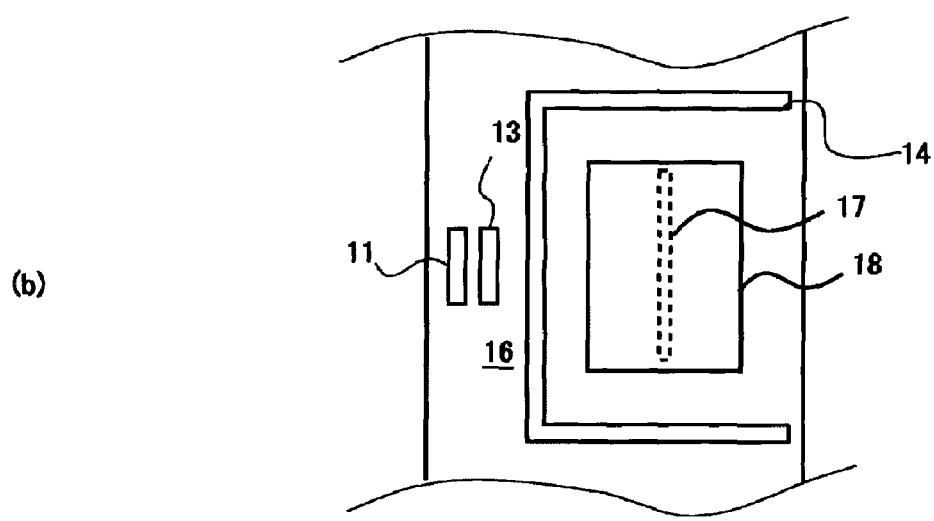

With reference now to FIGS. 7(a) and 7(b), in accordance with an embodiment of the present invention, drawings are shown that depict an example head structure for reducing heat from the heater element 17 on the read/write element, including the read element 11 and the write element 13. The thin-film magnetic-recording head 10 includes a groove 14 between the heater element 17 and the read/write element, including the read element 11 and the write element 13. A groove 14 formed in alumina 16 surrounding the elements is capable of interrupting heat flow from the heater element 17 to the read/write element, including the read element 11 and the write element 13.

In order to interrupt heat flow from the heater element 17 more effectively, in an embodiment of the present invention, a groove 14 is formed at each of the left and right sides of the heater element 17, where the radial direction of the magnetic-recording disk 2 is top-bottom direction of FIG. 7(b), rather than forming a groove only at the leading side of the heater element 17, which is between the heater element 17 and the read/write element, including the read element 11 and the write element 13. The groove 14 formed to surround the heater element 17 provides more effective interruption of heat flow.

As set forth above, embodiments of the present invention have been described by way of examples; but, embodiments of the present invention are not limited to the above-described examples, as elements of the above-described examples may, of course, be modified in various ways within the spirit and scope of embodiments of the present invention. For example, in one embodiment of the present invention, a HDD may bring a contact pad into contact with a magnetic-recording disk only in reading operations, or only in writing operations. Thus, in one embodiment of the present invention, the abrasion of the contact pad is suppressed; and, the contact pad is maintained in contact with the magnetic-recording disk. Embodiments of the present invention may be applied to disk drives using disks other than magnetic-recording disks as data-storage media. In accordance with embodiments of the present invention, the head-slider structure is not limited to the above-described structures with reference to the figures. Moreover, in accordance with embodiments of the present invention, various designs of the shapes and positions of the elements may be applied to embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a disk;
   a head-slider comprising:
      a read/write element comprising:
         a read element configured to read user data from said disk; and
         a write element configured to write user data to said disk;
      a first heater element;
      a contact pad; and
      a second heater element;
   a moving mechanism configured to support and configured to move said head-slider; and
   a controller configured to control said second heater element to control contact between said contact pad and said disk, and configured to control clearance between said read/write element and said disk by using said first heater element with said contact pad in contact with said disk.

2. The disk drive of claim 1, wherein said controller is configured to maintain the contact pad separated from said disk when user data is not being processed with said read/write element.

3. The disk drive of claim 2, wherein said controller is configured to maintain said contact pad separated from said disk upon reading user data with said read/write element.

4. The disk drive of claim 1, wherein said controller is configured to control said clearance with said first heater element after detecting contact between said contact pad and said disk.

5. The disk drive of claim 1, wherein said controller is configured to control said clearance according to a result of measuring said clearance with said contact pad in contact with disk.

6. The disk drive of claim 5, wherein said controller is configured to determine heater power Pe for said first heater element from preset data and heater power Pcc for said second heater element when said contact pad is in contact with said disk, is configured to access with said read/write element with heater power for said first heater element set at said heater power Pe if said heater power Pe is within a specified range, and is configured to reset heater power for said first heater element if said heater power Pe is out of said specified range.

7. The disk drive of claim 5, wherein said controller is configured to measure said clearance with said contact pad in contact with said disk, and is configured to control said clearance according to a difference between a measured clearance and a reference value upon accessing said disk with said write element.

8. A head-slider comprising:
   a slider; and
   a thin-film magnetic-recording head on said slider, said thin-film magnetic-recording head comprising:
      a read/write element comprising:
         a read element configured to read user data from a magnetic-recording disk; and
         a write element configured to write user data to a magnetic-recording disk;
      a contact pad formed on a flying surface of said thin-film magnetic-recording head;
      a first heater element located closer to said read/write element than said contact pad; and
      a second heater element located closer to said contact pad than said read/write element.

9. The head-slider of claim 8, wherein said thin-film magnetic-recording head includes a single contact pad, said read/write element and said contact pad are arranged in said stacking direction of said thin-film magnetic-recording head such that projections onto a flying surface of said head-slider of said contact pad and of at least a portion of said read/write element overlap when viewed in said stacking direction.

10. The head-slider of claim 9, wherein said contact pad is formed in proximity to a leading side of said read/write element.

11. The head-slider of claim 8, wherein a groove is formed between said second heater element and said read/write element.

12. The head-slider of claim 8, wherein a contact surface of said contact pad with said disk comprises carbon.

13. A method for controlling clearance of a read/write element in a disk drive, said method comprising:
   moving a head-slider to a target track of a disk;
   controlling a second heater element on said head-slider to control contact at said target track between a contact pad and a disk; and
   controlling clearance between a read/write element and said disk using a first heater element with said contact pad in contact with said disk.

14. The method of claim 13, further comprising:
maintaining said contact pad separated from said disk when user data is not being processed with said read/write element.

15. The method of claim 14, further comprising:
maintaining said contact pad separated from said disk upon reading user data with said read/write element.

16. The method of claim 13, further comprising:
performing clearance control with said first heater element after detecting contact between said contact pad and said disk.

17. The method of claim 13, further comprising:
performing clearance control according to a result of measuring said clearance with said contact pad in contact with disk.

18. The method of claim 17, further comprising:
determining heater power Pe for said first heater element from preset data;
determining heater power Pcc for said second heater element when said contact pad is in contact with said disk;
performing an access with said read/write element at said heater power Pe if said heater power Pe is within a specified range; and
resetting heater power for said first heater element if said heater power Pe is out of said specified range.

19. The method of claim 17, further comprising:
measuring said clearance with said contact pad in contact with said disk; and
controlling said clearance according to a difference between a measured clearance and a reference value upon accessing with a write element of said read/write element.

* * * * *